(12) United States Patent
Ferreol et al.

(10) Patent No.: US 6,989,789 B2
(45) Date of Patent: Jan. 24, 2006

(54) METHOD FOR LOCATING RADIOELECTRIC SOURCES USING TWO-CHANNEL HIGH RESOLUTION RADIOGONIOMETER

(75) Inventors: Anne Ferreol, Colombes (FR); Jean-Jacques Monot, Courdimanche (FR)

(73) Assignee: Thales, Paris (FR)

( * ) Notice: Subject to any disclaimer, the term of this patent is extended or adjusted under 35 U.S.C. 154(b) by 328 days.

(21) Appl. No.: 10/204,562

(22) PCT Filed: Feb. 23, 2001

(86) PCT No.: PCT/FR01/00540

§ 371 (c)(1),
(2), (4) Date: Aug. 22, 2002

(87) PCT Pub. No.: WO01/65272

PCT Pub. Date: Sep. 7, 2001

(65) Prior Publication Data

US 2003/0063029 A1 Apr. 3, 2003

(30) Foreign Application Priority Data

Feb. 25, 2000 (FR) .......................................... 00 02399

(51) Int. Cl.
*G01S 5/04* (2006.01)

(52) U.S. Cl. ...................... 342/440; 342/374; 342/378; 342/444

(58) Field of Classification Search ................ 342/374, 342/378, 444, 440, 441
See application file for complete search history.

(56) References Cited

U.S. PATENT DOCUMENTS

| 4,639,733 | A | * | 1/1987 | King et al. ................. 342/444 |
| H000374 | H | * | 11/1987 | Abo-Zena et al. .......... 342/378 |
| 4,780,722 | A | * | 10/1988 | Cusdin ....................... 342/446 |
| 5,262,789 | A | * | 11/1993 | Silverstein .................. 342/368 |
| 5,574,468 | A | * | 11/1996 | Rose ........................... 342/442 |
| 5,752,168 | A | | 5/1998 | Monot et al. |

(Continued)

FOREIGN PATENT DOCUMENTS

| DE | 36 39 057 | 4/1988 |
| DE | 44 07 716 | 9/1995 |
| EP | 0 847 161 | 6/1998 |
| EP | 0 926 510 | 6/1999 |

OTHER PUBLICATIONS

M. Viberg et al.: "Detection and estimation in sensor arrays using weighted subspace fitting" IEEE Transactions on Signal Processing, vol. 39, No. 11, pp. 2436–2449 Nov. 1991.

(Continued)

*Primary Examiner*—Bernarr E. Gregory
*Assistant Examiner*—Fred H. Mull
(74) *Attorney, Agent, or Firm*—Oblon, Spivak, McClelland, Maier & Neustadt, P.C.

(57) ABSTRACT

A process for locating radio sources by a two-channel high resolution radiogoniometer including a network of a specified number N of sensors. The process multiplexes the signals supplied by the N sensors on the inputs of only two receivers. Then, with the aid of a calculation device coupled to the outputs of the two receivers, the angles of arrival of the waves emitted by the sources are estimated on the basis of an estimation of the covariance matrix of the signals supplied by the two receivers.

6 Claims, 9 Drawing Sheets

U.S. PATENT DOCUMENTS

| | | |
|---|---|---|
| 6,205,341 B1 | 3/2001 | Monot et al. |
| 6,239,746 B1 | 5/2001 | Pipon et al. |
| 6,240,098 B1 | 5/2001 | Thibault et al. |
| 6,253,084 B1 | 6/2001 | Monot |
| 6,313,794 B1 * | 11/2001 | Rose ........................ 342/424 |
| 6,349,207 B1 | 2/2002 | Monot et al. |
| 6,377,213 B1 * | 4/2002 | Odachi et al. .............. 342/383 |
| 6,430,239 B1 | 8/2002 | Ferreol |

OTHER PUBLICATIONS

H. Mewe et al.: "A comparison of various high resolution spectral estimation techniques in radio direction finding (ein vergleich verschiedener hochaufloesender spektralschaetzmethoden in der funkpeiltechnik)" Frequenz, DE, Schiele Und Schon GMBH, vol. 50, No. 1/02, pp. 28–34.

* cited by examiner

- ● Initial network
- ★ Equivalent network with small bases
- ■ Equivalent network with large bases

- Initial network
- ★ Equivalent network with small base
- ■ Equivalent network with large base

FIG.24

▨ — Signal acquisition period

FIG.25

METHOD FOR LOCATING RADIOELECTRIC SOURCES USING TWO-CHANNEL HIGH RESOLUTION RADIOGONIOMETER

BACKGROUND OF THE INVENTION

The present invention relates to a process for locating radio sources by means of a two-channel high resolution radiogoniometer, the goniometry having been carried out on the basis of an antenna network comprising several antennas.

The objective of a conventional radiogoniometry system is to estimate the angles of arrivals of radio waves incident on a network of sensors. To do this, a network of N sensors is coupled to a calculation device by way of N receivers to estimate the angles of incidence θp of the radio waves transmitted by various sources and received on the network.

The benefit of implementing as many sensors as receivers is that this makes it possible to acquire the signals $x_1(t)$ up to a $x_N(t)$ supplied by each of the sensors of the network at the same instant t.

SUMMARY OF THE INVENTION

The goniometry methods used are second-order high resolution methods. They consist in performing an estimation of the angles of incidence θm of sources based on estimating the covariance matrix $R_x$ of a vector x(t) formed of the components $X_1(t), \ldots X_N(t)$ and defined by the relation:

$$R_x = E[\underline{x}(t)\underline{x}(t)^\dagger] \quad (1)$$

where E[.] denotes the mathematical expectation and + denotes the transpose and conjugate of the vector $\underline{x}(t)$. For a duration of observation T of the signals xn(t), the estimator $\hat{R}_x$ of $\hat{R}_x$ is calculated through the relation:

$$\hat{R}_x = \frac{1}{T} \sum_{t=t_o}^{t_n+T} \underline{x}(t)\underline{x}(t)^\dagger \quad (2)$$

The terms $r_{ij} - \hat{R}_x(i,j)$ of the $i^{th}$ row and the $j^{th}$ column of the covariance matrix $\hat{R}_x$ are obtained through the relation:

$$r_{ij} = \frac{1}{T} \sum_{t=t_n}^{t_n+T} x_i(t)x_j(t)^* \quad (3)$$

in which $x_j(t)^*$ denotes the conjugate of the signal $x_j(t)$.

The matrix covariance of $R_x$ and of its terms $r_{ij}$ make it possible to obtain all possible phase shifts $\phi_{ij}$ between sensors i and j.

The goniometry methods using the covariance matrix have the property of maximizing or minimizing a pseudo-spectrum as a function of the angle of incidence θ so as to estimate the angles of incidence $θ_m$ of the sources with $1 \leq m \leq M$ such that:

$$\text{Pseudo}(θ) = \underline{a}(θ)^t \text{Proj } \underline{a}(θ) \quad (4)$$

The projector Proj depends on the processing methods implemented. It is conventional to class these methods into three categories, a first category known as the "method of channel formation", a second category known as the "CAPON method" and finally a third method known as "MUSIC".

The method by channel formation makes it possible to carry out the goniometry of a single source at the time. The angle of incidence of this source is determined by using the covariance matrix as a projector and by searching for the coordinates of the maximum of the pseudo-spectrum.

The CAPON method makes it possible to perform one goniometry on several sources at once by using the inverse covariance matrix $R_x^{-1}$ as projector and, for the calculation of the angles of incidence, by searching for the coordinates for which the pseudo-spectrum is a minimum.

The "MUSIC" method makes it possible to perform one goniometry of several sources at once by using the noise projector calculated on the basis of an EVD of the covariance matrix Rx and, for the calculation of the angles of incidence, by searching for the coordinates of the minima of the pseudo-spectrum.

In order for a radiogoniometry system of the type just described to operate correctly, the N receivers must have perfectly identical transmission characteristics. Rather, given their analog nature, this condition is in practice never realized, this is why the goniometry process is supplemented with a gage procedure. The function of the gage procedure is to estimate N−1 gage filters $F_n$ coupled to each receiver.

However, this process requires the estimation of the filters $F_n$ with each change of gain and of frequency of the receivers. This processing is relatively complicated to implement and increases the cost of embodiments.

Contrary to most known high-resolution radiogoniometers which comprise as many receivers as antennas, and where the number of antennas determines the number of receivers and hence the financial cost of the reception system, one of the aims of the invention is to decrease this hardware cost by using just two receivers for the same specified number of antennas which may be far greater than 2, hence the name two-channel system which is used subsequently here.

Although radiogoniometry systems using just two receivers are also known, the latter can perform a goniometry on just one source at a time due to the algorithm used which is of interferometric type. Such systems are in particular marketed by the applicant under the reference TRC8000 of the products in its catalog. They are mainly intended for monitoring the radio spectrum in the HF and the V/UHF ranges. However, these systems are no longer suitable when they are either in the presence of multi-transmissions when the density of transmitters to be monitored is too large as is often the case in the HF range, or when the medium propagating the wave transmitted by a transmitter is disturbed and causes it to follow multiple paths. Under these conditions the conventional two-channel goniometry systems exhibit malfunctions.

The aim of the invention is to carry out a multi-source goniometry with a two-channel reception system not comprising the aforesaid drawbacks.

Accordingly, the subject of the invention is a process for locating radio sources by means of a two-channel high resolution radiogoniometer comprising a network of a specified number N of sensors, characterized in that it comprises at least the following steps:—multiplexing the signals supplied by the N sensors on the inputs of only two receivers and—estimating the angles of arrival of the waves emitted by the sources on the basis of an estimation of the covariance matrix of the signals supplied by the two receivers.

The subject of the invention is also a radiogoniometer for the implementation of the process.

BRIEF DESCRIPTION OF THE DRAWINGS

Other characteristics and advantages of the invention will become apparent from the description which follows and made in conjunction with the appended drawings which represent.

DETAILED DESCRIPTION OF THE PREFERRED EMBODIMENTS

The process according to the invention which is described hereinbelow can be applied equally to two different acquisition systems which are variant executions of one another, a first system represented in FIGS. 1 and 3 which acquires the signal with a reference channel and a second system represented in FIGS. 10 and 11 which acquires the signal using pairs of sensors of sensors.

Figure 1:
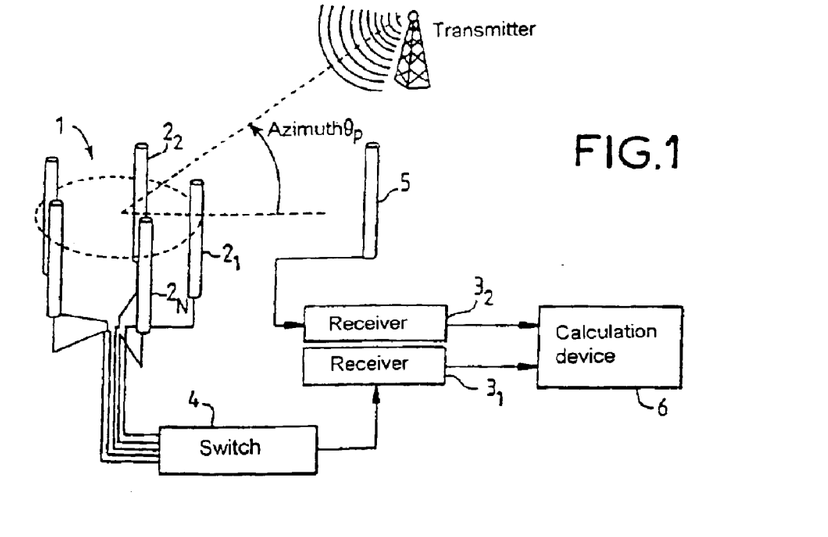
FIG. 1 a first embodiment of a radiogoniometer using just two reception channels according to the invention.
Figure 2:
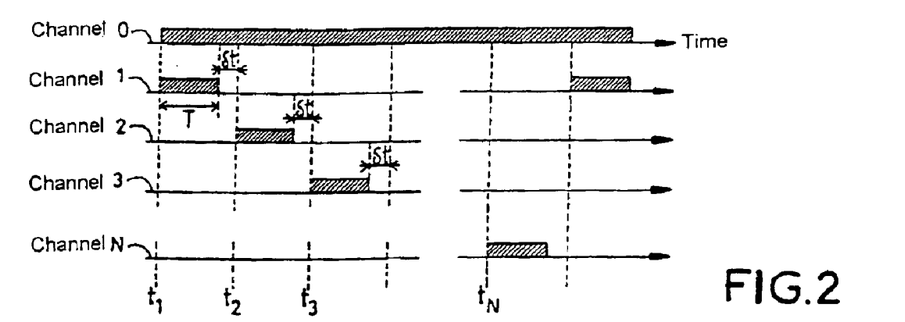
FIG. 2 a time chart of the signal acquisition periods on each of the reception channels of the radiogoniometer of FIG. 1.

The first acquisition system which is shown in FIG. 1 comprises a network 1 formed of N sensors $2_1$ to $2_N$ coupled to the input of a receiver $3_1$, by way of a switch 4, and a sensor 5 coupled to the input of a second receiver $3_2$. A device 6 for calculating the angles of arrival of the radio waves transmitted by distant transmitters $7i$ on the network 1 is coupled to the outputs of the two receivers $3_1$ and $3_2$. In this system, the switch 4 multiplexes the signals originating from the sensors $2_1$ to $2_N$ so as to apply them successively to the input of the receiver $3_1$ while the second receiver $3_2$ is permanently coupled to the reference sensor 5. In what follows "channel 0" denotes the link between the reference sensor 5 and the receiver $3_2$ and respectively by channels 1 to N the N existing links between the sensors $2_1$ to $2_N$ and the switch 4. By considering a non-zero switching time δt, the multiplexing of the signals acquired via each of the channels is represented in the time chart for FIG. 2, from where it is apparent that the signal received on receiver $3_2$ is occupied constantly by the signal of the reference channel (channel 0) and that of the receiver $3_1$ is occupied alternately during a specified time interval T by the signals of the channels of the network going from 1 to N. A corresponding schematic diagram of the signals on reception is shown in FIG. 3 where the counterpart elements to those of FIG. 1 are represented with the same references.

Figure 3:
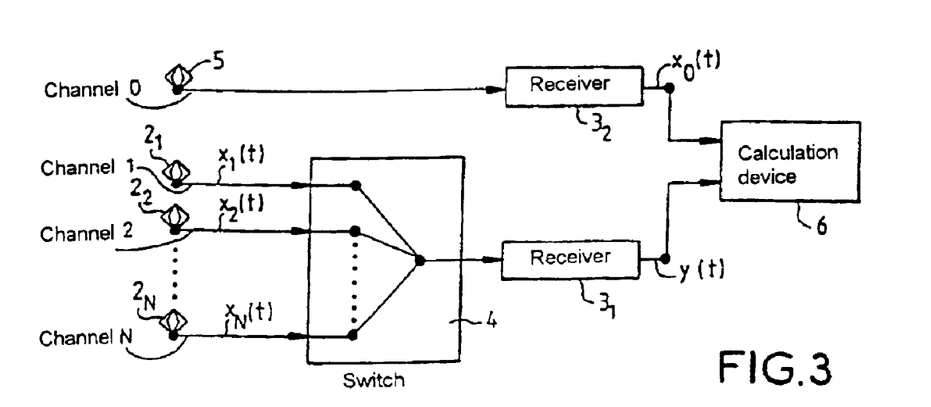
FIG. 3 a schematic diagram of reception of the signals on each of the channels.

In FIG. 3, the signal y(t) obtained at the output of the receiver $3_1$ is formed successively of the signals $x_1(t)$, $x_2(t)$ up to $x_N(t)$ acquired on each of the channels and transmitted by the switch 4 to the input of the receiver $3_1$. In this embodiment, it is preferable for the reference sensor 5 to be formed of an antenna of the same type as the sensors of the network so as to obtain the same radiation pattern and thus be suitable for the same signals.

To determine the angles of incidence of the radio waves supplied to the network 1 a first method consists in executing an algorithm of the maximum likelihood type of the type described in the thesis by M. P. Larzabal entitled: "Application du maximum de vraisemblance au traitement d'antenne: radio-goniométrie et poursuite de cibles" [Application of maximum likelihood to antenna processing: radiogoniometry and tracking of targets] Université de Paris Sud ORSAY, June 1992MV. To do this, the calculation device 6 is programed to perform the cross-correlation of the signals between the reference channel 0 and channel 1 and the instant $t_1$, up to the cross-correlation of the signals between the reference and channel N at instant $t_N$. N cross-correlations are then calculated with respect to the reference channel 0 over a duration T thereby giving the following estimates:

$$\hat{r}_{n0} = \frac{1}{T} \sum_{t=t_n}^{t_n+T} x_n(t) x_0(t)^* \quad (5)$$

where $x_0(t)$ is the signal received on the reference sensor and $x_n(t)$ that of the $n^{th}$ sensor. When the duration of integration approaches infinity, $\hat{r}_{n0}$ tends to the asymptotic cross-correlation $r_{n0}$ with the following expression:

$$r_{n0} = E[x_n(t) x_0(t)^*] \quad (6)$$

where E[.] denotes the mathematical expectation. In the foregoing, it should be noted that $\hat{r}_{n0}$ is an estimator of $r_{n0}$ and that the proper estimation of these cross-correlations depends on the integration time T. In the above relations each signal $x_n(t)$ supplied by a sensor n and obtained from M sources can be represented by an expression of the form:

$$x_n(t) = \sum_{m=1}^{M} a_n(\theta_m) s_m(t) + b_n(t) \quad (7)$$

Where $s_m(t)$ is the complex amplitude of the signal of the $m^{th}$ source and $a_n(\theta_m)$ the response of the network of sensors to a source with angle of incidence $\theta_m$ and $b_n(t)$ is the additive noise on sensor "n". The expression (7) still satisfies the matrix relation:

$$x_n(t) = \underline{a}_n^T \underline{s}(t) + b_n(t) \quad (8)$$

where $\underline{a}_n^T = [a_n(\theta_1) \ldots a_n(\theta_M)]$ and $\underline{s}(t) = [s_1(t) \ldots s_M(t)]^T$ The signal vector on all the sensors $\underline{x}(t)=[x_1(t) \ldots x_N(t)]^T$ has the mathematical expression $$\underline{x}(t) = A \ \underline{s}(t) + \underline{b}(t) \quad (9)$$

$$\text{where } A = \begin{bmatrix} \underline{a}_1^T \\ \underline{a}_N^T \end{bmatrix} = [\underline{a}(\theta_1) \ldots \underline{a}(\theta_M)] \text{ and } \underline{a}(\theta) = \begin{bmatrix} a_1(\theta) \\ \vdots \\ a_N(\theta) \end{bmatrix}$$

where $\underline{a}(\theta)$ is a direction vector which represents the response of the network of sensors to a source of angle of incidence $\theta$.

According to (8) and assuming that the level of the incident sources has not changed at the switching instants $t_n$, it is apparent that all the cross-correlations depend on the same covariance matrix of the sources $R_s = E[\underline{s}(t)\underline{s}(t)^t]$ such that:

$$r_{n0} = \underline{a}_n^T R_s \underline{a}_0^* \text{ for } 1 \leq n \leq N \quad (10)$$

where $\underline{s}(t)$ denotes the source vector.

Figure 4:
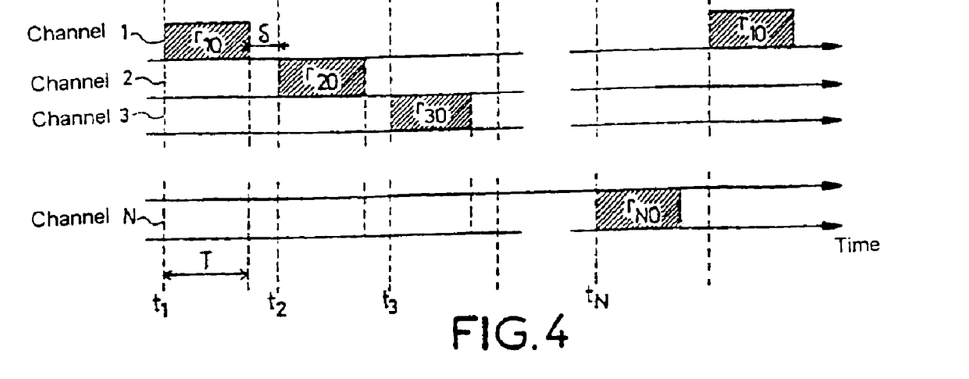
FIG. 4 a time chart of the various cross-correlations performed on each of the channels.

A time chart assembling all these cross-correlations is shown in FIG. 4.

By concatenating all the cross-correlations $r_{n0}$ so as to assemble them into one and the same vector $\underline{r}$ and by taking account of the relation (15) as well as of the expression for the matrix A in relation (9) the vector r is defined by the relation:

$$\underline{r} = \begin{bmatrix} r_{10} \\ \vdots \\ r_{N0} \end{bmatrix} = \begin{bmatrix} \underline{a}_1^T R_s \underline{a}_0^* \\ \vdots \\ \underline{a}_N^T R_s \underline{a}_0^* \end{bmatrix} = A \ R_s \underline{a}_0^* = A \ \alpha \quad (11)$$

Knowing that $A = [\underline{a}(\theta_1) \ldots \underline{a}(\theta_M)]$, it is apparent that $\underline{r}$ is a simple linear combination of the direction vectors $\underline{a}(\theta_m)$ of the M incident sources, such that:

$$\underline{r} = \begin{bmatrix} r_{10} \\ \vdots \\ r_{N0} \end{bmatrix} = \sum_{m=1}^{M} {}_m \underline{a}(\theta_m) \quad (12)$$

where $\alpha_m$ is the $m^{th}$ component of the vector $\alpha = R_s \underline{a}_0^*$.

The problem of two-channel goniometry implemented by the invention therefore appears to be equivalent to that of conventional goniometry using a single temporal sample. This observation shows that the MUSIC method may be applied to perform goniometry of at most one source. In the current state of the art, presupposing nothing with regard to the network, the only solution for performing goniometry of several sources is to apply a method of the maximum likelihood or Weighting Subspace Fitting (WSF) type such as described for example in the article by M. Viberg, B. Ottersten and T. Kailath "Detection and estimation in sensor arrays using Weighted Subspace Fitting" IEEE trans on signal processing, Vol 39, no. 11, November 1991.

Thus, after having normalized the vector $\underline{r}$ into $\underline{\tilde{r}}$, the angles of incidence of the sources are obtained by searching for the $M^{tuple}$ $(\theta_1 \ldots \theta_M)$ which minimizes the criterion:

$$J(\theta_1 \ldots \theta_M) = \text{trace}[(I - A(\theta_1 \ldots \theta_M)(A(\theta_1 \ldots \theta_M)^t A \\ (\theta_1 \ldots \theta_M))^{-1} A(\theta_1 \ldots \theta_M)^t) \underline{\tilde{r}} \ \underline{\tilde{r}}^t] \quad (13)$$

by using for example the known Gauss-Newton algorithm for the maximum likelihood in terms of azimuth and elevation as described in Annexes A and B.

Since $\underline{\tilde{r}}$ is normalized, this criterion varies between 0 and 1 and reaches 0 for the sought-after $M^{tuple}$.

Figure 5:
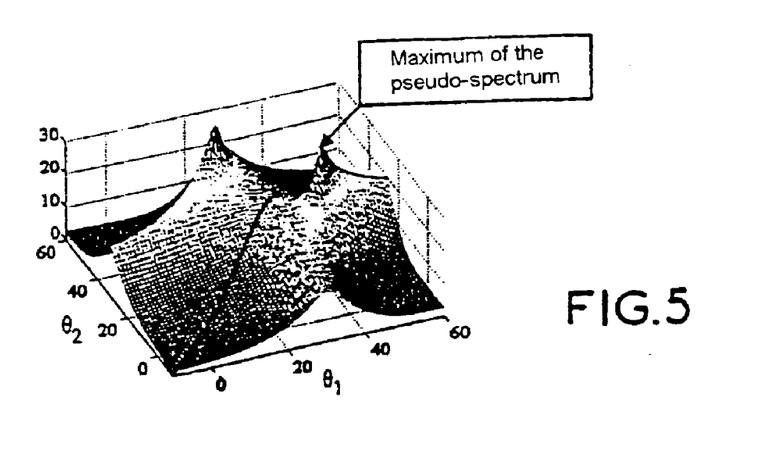
FIGS. 5 and 6 a frequency pseudo-spectrum obtained for two sources with angles of incidence θ1 and θ2.
Figure 6:
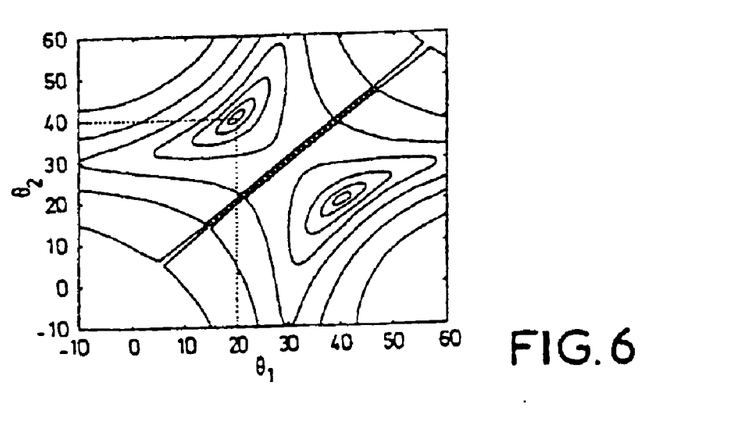

An example of obtaining a pseudo-spectrum in the case of goniometry of two sources with angles of incidence $\theta_1 = 20$ deg and $\theta_2 = 40$ deg is represented in FIGS. 5 and 6.

This pseudo-spectrum contains maxima for angles $\theta$ at around (20°, 40°) and symmetrically at (40°, 20°) which correspond to the angles of incidence of the two sources. The maxima of this pseudo-spectrum appear better in the iso-level curve of FIG. 6.

A second method implemented by the invention implements an algorithm of the temporal MUSIC type.

This method consists in raising the number of observations while calculating a cross-correlation vector $\underline{r}(\tau)$ such that:

$$\underline{r}(\tau) = \begin{bmatrix} r_{10}(\tau) \\ \vdots \\ r_{N0}(\tau) \end{bmatrix} = \begin{bmatrix} \underline{a}_1^T R_s(\tau) \underline{a}_0^* \\ \vdots \\ \underline{a}_N^T R_s(\tau) \underline{a}_0^* \end{bmatrix} \quad (14)$$

$R_s(\tau) = E[\underline{s}(t)\underline{s}(t-\tau)^t]$ and $r_{n0}(L) = E[x_n(\tau)x_0(t-\tau)^*]$ Assuming, as often holds, that the incident signals do not vary in amplitude during the observation period, the matrix $R_s(\tau)$ does not depend on the instants $t_n$ of switchings and may be factored in expression (14). The vector $\underline{r}(\tau)$ then satisfies the expression:

$$\underline{r}(\tau) = A \ R_s(\tau) \underline{a}_0^* = A \ \alpha(\tau) \quad (15)$$

$$\underline{r}(\tau) = \begin{bmatrix} r_{10}(\tau) \\ \vdots \\ r_{N0}(\tau) \end{bmatrix} = \sum_{m=1}^{M} \alpha_m(\tau) \underline{a}(\theta_m)$$

On the basis of the differents $\underline{r}(\tau)$ the covariance matrix is estimated by applying the relations:

$$R = \sum_{k=1}^{K} \underline{r}(\tau_k) \underline{r}(\tau_k)^\dagger \quad (16)$$

$$\text{with } R = A \ R_k A^\dagger \text{ where } R_k = \sum_{k=1}^{K} \underline{k}(\tau_k) \underline{k}(\tau_k)^\dagger \quad (17)$$

The separation of the incident sources is then achieved by applying an algorithm of the MUSIC type to the matrix R using the direction vector $\underline{a}(\theta)$ since $A = [\underline{a}(\theta_1) \ldots \underline{a}(\theta_M)]$.

Figure 7:
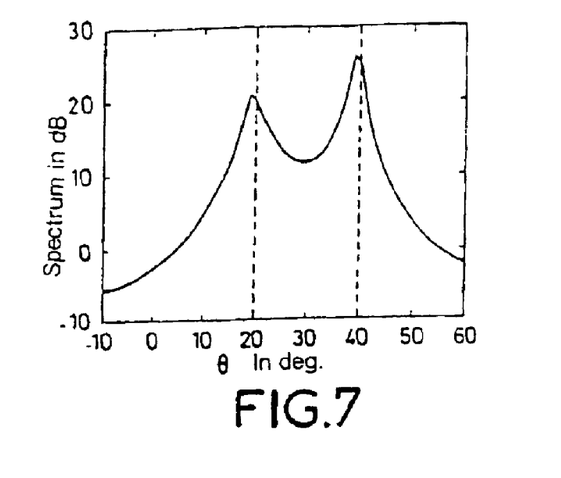
FIG. 7 a pseudo-spectrum obtained for two sources by using the MUSIC algorithm.

Returning to the previous example with two sources with angles of incidence 20° and 40° the pseudo-spectrum obtained is represented in FIG. 7. This figure shows that the two maxima have angular coordinates $\theta 1$ and $\theta 2$ which are not very far from the angles of the incident sources.

This second method is valid only if the rank of the matrix R is equal to M in the presence of M sources. This condition is satisfied by estimating at least M non-colinear vectors $\underline{r}(\tau_k)$, this colinearity depending on the modulation of the incident sources.

In the multi-transmitter case with one path, and regarding the transmitters to be in principle uncorrelated, the matrix $R_s(\tau)$ is diagonal and the elements of this diagonal depend on the impulse responses $r_s^m(\tau) = E[s_m(t)s_m(t-\tau)^*]$ of each of the transmitters for $1 \leq m \leq M$.

Thus the vectors $\underline{r}(\tau)$ of expression (15) become:

$$\underline{\alpha}(\tau) = \text{diag}\{r_s^m(\tau)\}\underline{a}_0^* = \begin{bmatrix} r_s^1(\tau)a_0(\theta_1)^* \\ \vdots \\ r_s^M(\tau)a_0(\theta_M)^* \end{bmatrix} \quad (18)$$

It follows that this second method is no longer valid when the vectors $\underline{r}(\tau)$ and $\underline{r}(0)$ are colinear and that consequently so are the vectors $\alpha(\tau)$ and $\alpha(0)$. Thereupon $\alpha(\tau)$ is equal to $\lambda \, \alpha(0)$ and according to (18) each transmitter satisfies:

$$r_s^m(\tau)a_0(\theta_m)^* = \lambda r_s^m(0)a_0(\theta_m)^* \quad (19)$$

According to (19) the condition of nonoperation of the method becomes:

$$r_s^m(\tau) = \frac{r_s^m(0)}{r_s^1(0)} r_s^1(\tau) = \gamma_m r_s^1(\tau) \quad (20)$$

Thus in this case, the functions $r_s^m(\tau)$ are equal to within an amplitude $\gamma_m$, this corresponding to signals of like modulation and of like carrier frequency. Conversely, signals of like modulation on different carrier frequencies no longer satisfy the condition of nonoperation. The latter remark shows that the temporal MUSIC method will fail only very exceptionally in the presence of modulations having the same waveform, the same bit rate and the same carrier frequency.

In the presence of a single transmitter of a signal $s_0(t)$ and of several paths, each path is modelled for example by a propagation delay $\tau_m$ and an attenuation $\rho_m$. It follows that the expression for the signal $x_n(t)$ on the sensor n of equation (7) becomes:

$$x_n(t) = \sum_{m=1}^{M} a_n(\theta_m) s_m(t) + b_n(t) \text{ with } s_m(t) = \rho_m s_0(t - \tau_m) \quad (21)$$

The matrix $R_s(\tau)$ depends in this case on the impulse response $r_s^0(\tau) = E[s_0(t)s_0(t-\tau)^*]$ of the signal emitted $s_0(t)$. Thus the element of the $i^{th}$ row and $j^{th}$ column of the matrix $R_s(\tau)$ takes the following expression:

$$R_s(\tau)(i,j) = \rho_i \rho_j^* r_s^0(\tau + \tau_j - \tau_i) = \gamma_{ij} r_s^0(\tau + \tau_j - \tau_i) \quad (22)$$

As indicated hereinabove, the temporal MUSIC method is no longer applicable when the vectors $\alpha(\tau)$ and $\alpha(0)$ are colinear. Given that $\alpha(\tau) = Rs(\tau)\underline{a}_0^*$, and according to (22), $\alpha(\tau) = \lambda\alpha(0)$ when:

$$\sum_{j=1}^{M} \gamma_{ij} r_s^0((\tau + \tau_j - \tau_i)a_0(\theta_j)^* = \lambda \sum_{j=1}^{M} \gamma_{ij} r_s^0(\tau_j - \tau_i)a_0(\theta_j)^* \quad (23)$$

this implying independent transmitters possessing the same waveform, the same bit rate and one and the same carrier and moreover that the propagation paths arrive at the same instants. These conditions are fulfilled only very exceptionally.

Figure 8:
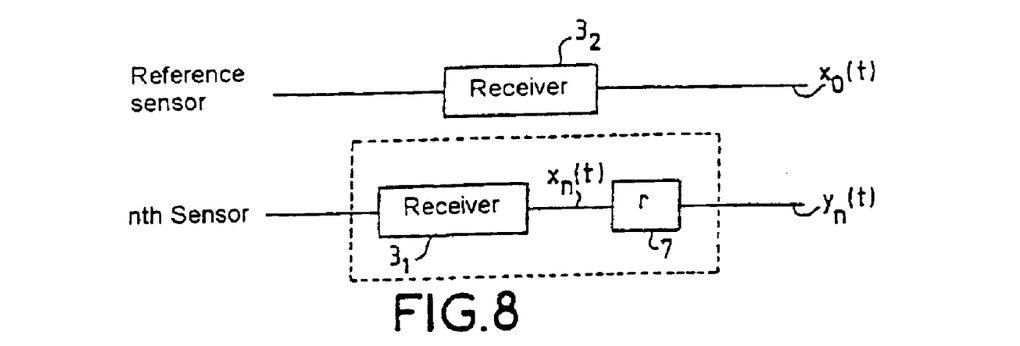
FIG. 8 the supplementing of one of the two receivers of the radiogoniometer according to the invention with a gage filter at the output.
Figure 9:
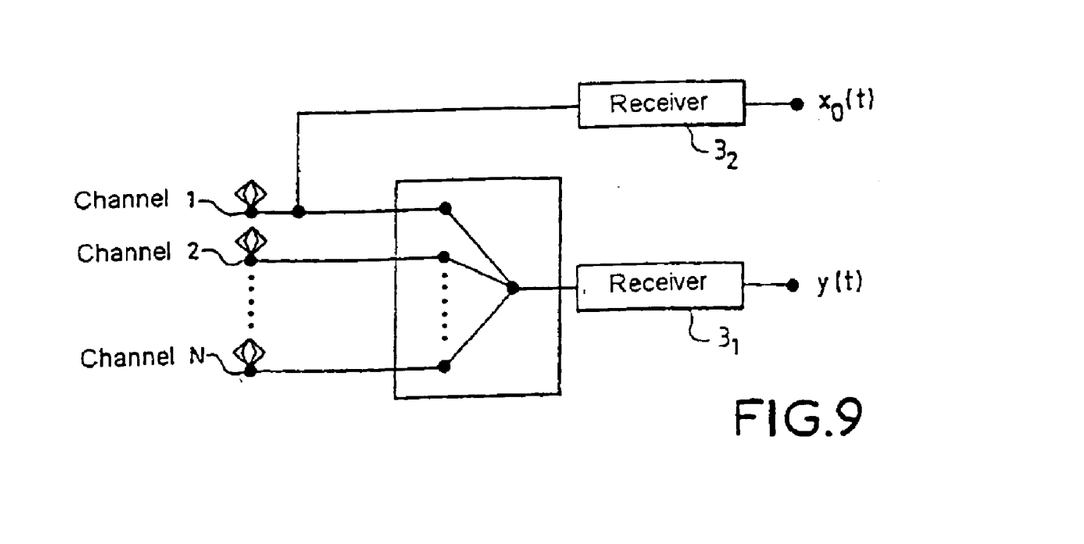
FIGS. 9 and 10 varied embodiments of the radiogoniometer of FIG. 1.

Just as in the multi-channel radiogoniometers of the prior art in order to cater for the fact that the two receivers $3_1$ and $3_2$ are not perfectly identical, one of the two receivers is then supplemented with a gage filter 7 which models the distortion between the two receivers FIG. 8.

In this FIG. 8, the signal $Y_n(t)$ obtained at the output of the receiver 32 is convolved with the signal Xn(t) leaving the receiver via the response of the filter 7. Taking account of the equation (2) the signals $x_n(t)$ and $y_n(t)$ then satisfy the relations:

$$x_n(t) = \underline{a}_n^T \underline{s}(t) + b_n(t) \text{ and } y_n(t) = \underline{a}_n^T \underline{s}_F(t) + b_n(t) \quad (24)$$

where the signal vector $\underline{s}_F(t)$ is equal to the product of convolving the signal vector $\underline{s}(t)$ with the impulse response of the filter F.

In this context, in order not to carry out any gaging, it is sufficient to use the signal $y_n(t)$ instead of the signal $x_n(t)$. Thus the cross-correlation $c_{n0}$ between the signals $y_n(t)$ and $x_0(t)$ has the following expression:

$$c_{n0} = \underline{a}_n^T R_{sF} \underline{a}_0^* \text{ with } R_{sF} = E[\underline{s}_F(t)\underline{s}(t)^t] \quad (25)$$

According to the expression (25), the vector $\underline{c}$ which contains all the cross-correlations with the reference sensor has the following expression:

$$\underline{c} = \begin{bmatrix} c_{10} \\ \vdots \\ c_{N0} \end{bmatrix} = A \, R_{sF} \underline{a}_0^* \quad (26)$$

The equation (26) having the same structure as equation (11), it can be applied to an algorithm of the maximum likelihood type based on $\underline{c}$. Likewise, replacing the signals $x_n(t)$ by the signals $y_n(t)$ also makes a method of the temporal MUSIC type applicable. These remarks show that a two-channel goniometer with a reference channel can operate without performing any gaging.

When the additive noise $b_n(t)$ originates from the receivers, it is uncorrelated between the channels. In particular, it is noise $b_0(t)$ of the reference channel which can be eliminated from equations (10) (15) and (25). This makes it possible to implement these algorithms with low signal-to-noise ratio.

Naturally, the methods described hereinabove require the installation of a reference sensor of the same type or substantially identical as the sensors of the network. In the HF range, it is easy to place an additional crossframe at the center of the network. In the V/UHF range the network of sensors is fixed on a rigid structure, which leads to this additional sensor being installed within this structure. For example in V/UHF where it is commonplace to use a pentagonal network of dipoles linked to a mast by metal arms, the ideal installation is one where the reference sensor is at the center at the place or at the top of the mast. Two alternatives to the installation of a reference sensor also appear to be possible the first alternative consists in taking one of the sensors of the network as reference sensor.

Figure 10:
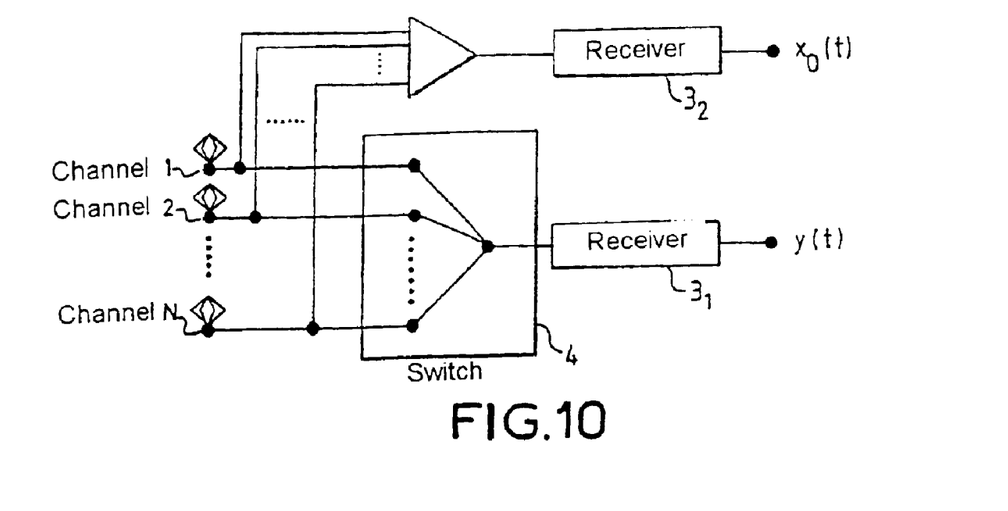

However when it is difficult to install a reference sensor the above algorithms remain applicable by choosing one of the sensors of the network as reference sensor as indicated by the diagram of FIG. 10. If the noise originates solely from the receivers, the cross-correlation of sensor 1 on channel 1 with this same sensor on channel 2 will not be affected by a noise component. Thus the vector $\underline{r}$ of the equation (11) becomes:

$$\underline{r} = \begin{bmatrix} r_{11} \\ r_{21} \\ \vdots \\ r_{N1} \end{bmatrix} = A \, R_s \underline{a}_1^* \quad (27)$$

Equation (15) of the temporal MUSIC method becomes:

$$\underline{r}(\tau) = \begin{bmatrix} r_{11}(\tau) \\ r_{21}(\tau) \\ \vdots \\ r_{NI}(\tau) \end{bmatrix} = A\ R_s(\tau)\underline{a}_1^* \quad (28)$$

and the two-channel temporal MUSIC and Maximum Likelihood algorithms remain applicable.

Since the various sensors may in this case receive the signal from a given direction with different levels, it would be ideal to take the sensor receiving the strongest signal level as reference. However when the level of the signal on the sensors depends on the direction of the source, the signal obtained on this reference sensor might change as a function of the angles of incidence of the sources.

To circumvent this problem, an alternative consists in making a reference sensor by combining the signals received on the various sensors. This can be achieved through a channel preformation consisting for example in adding the signals originating from the various sensors as indicated by the diagram of FIG. 10.

Figure 11:
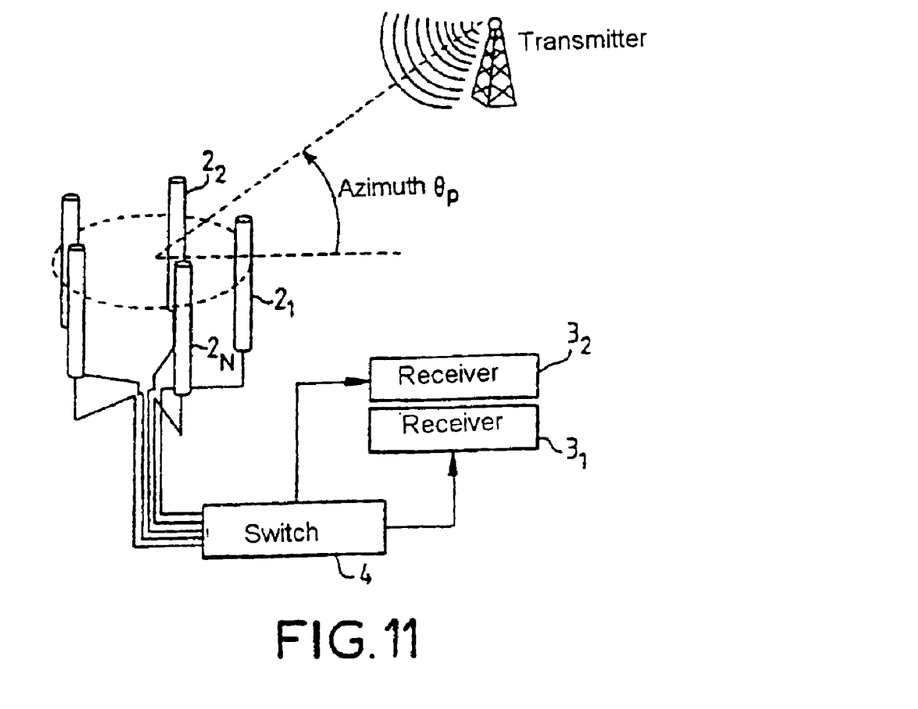
FIG. 11 a second embodiment of a multichannel radiogoniometer operating by selecting pairs of sensors on just two reception channels.

In accordance with the second embodiment of a radiogoniometer according to the invention and which is represented in FIG. 11 where the elements counterpart to those of FIG. 1 are represented with the same references, the goniometry system switches any pair of sensors onto the two reception channels. The goniometry can then be carried out either by reconstructing the entire covariance matrix or by reconstructing just a part thereof only so as to decrease the processing time.

Figure 12:
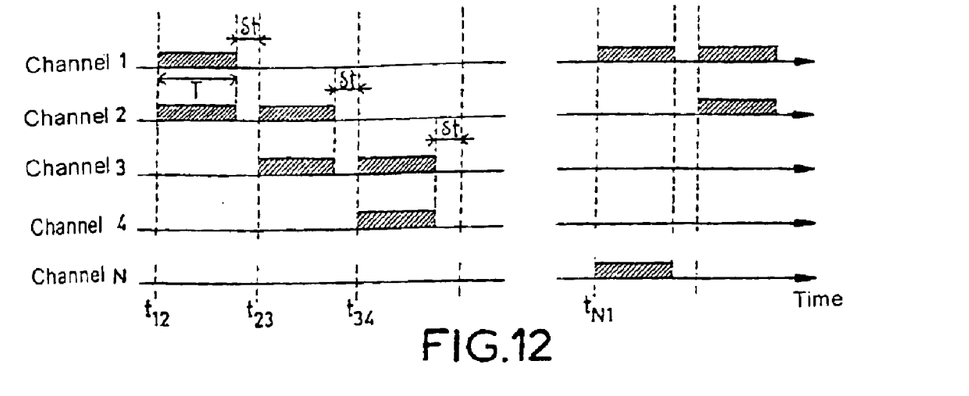
FIG. 12 a time chart showing the periods of signal acquisition by the radiogoniometer of FIG. 11.

The switch 4 has the role of connecting two sensors of the network to the two reception channels while never choosing the same sensor twice. This system can be used for example on the pentagonal antenna networks of radiogoniometers of the V/UHF range where the switchings are carried out either on the small bases or large bases of the network. A time chart of the signal acquisition periods is represented in FIG. 12.

Figure 13:
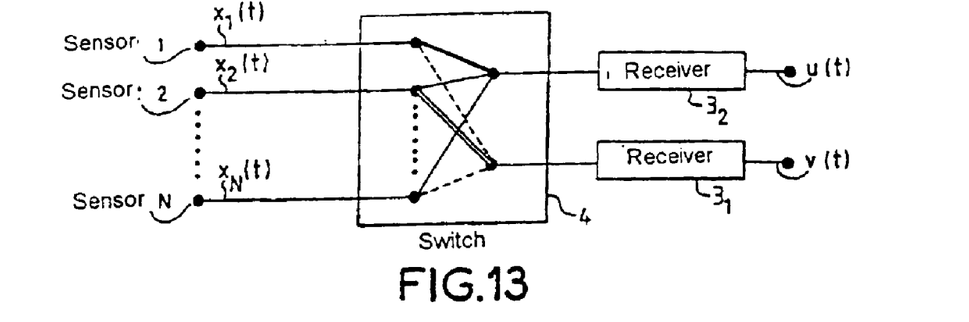
FIG. 13 a diagram illustrating the manner of operation of the radiogoniometer of FIG. 11.

This time chart corresponds to the operation of the switch 4 shown diagrammatically in FIG. 13 from which it is apparent that the signals v(t) and u(t) obtained at the output of the receivers $3._1$ and $3._2$ can be formed alternately by the signals $x_1(t)$, $x_2(t)$ up to $x_N(t)$.

Figure 14:
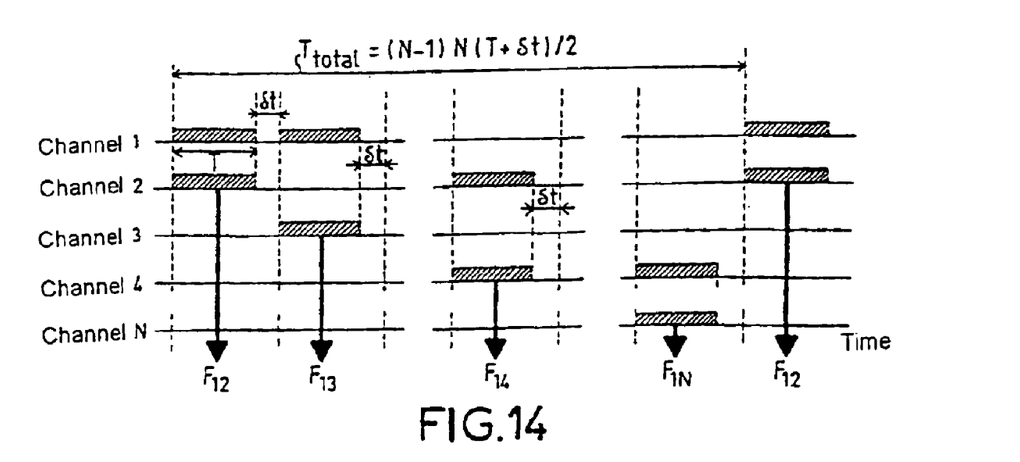
FIG. 14 a temporal diagram of the reconstruction of the temporal covariance matrix.

By using the previous acquisition system, the covariance matrix $R_x$ of equation (1) can be reconstructed. To do this all the terms $r_{ij}$ of the $\underline{i}^{th}$ row and $j^{th}$ column of $R_x$ are estimated on the basis of the instants $t_{ij}$ and over a duration T as indicated by the time chart of FIG. 14.

Figure 15:
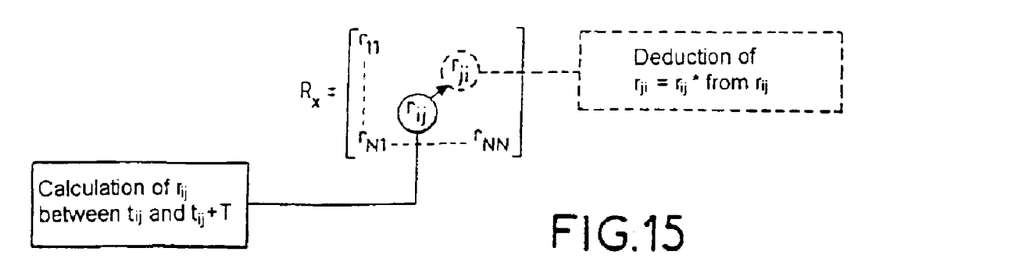
FIG. 15 a diagram for illustrating the method of calculating the coefficients of the covariance matrix.

To estimate the matrix $R_x$, it is sufficient to calculate the lower triangular part of this matrix as indicated in FIG. 15. Thus after having calculated the term $r_{ij}$, $r_{ji}$ is deduced therefrom through the relation $r_{ji}=r_{ij}^*$. Over a network with N sensors it is thus sufficient to carry out N(N–1)/2 switchings. Thus for an elementary goniometry the signal can be observed over a duration $T_{total}$=N(N–1)(T+δt)/2. Consequently with N=5 sensors it is sufficient to carry out ten switchings.

The matrix $R_x$ thus estimated makes it possible to apply any high-resolution goniometry method. However, unlike in the conventional goniometer where the cross-correlations $r_{ij}$ are all estimated on the basis of the same instant $t_0$, they take place at the instants $t_{ij}$ in the present case.

It should be noted that the above operations can be carried out either without or with gaging depending on the duration of observation of the signals on the various sensors.

If as indicated above $r_{ji}$ is deduced from $r_{ij}$ through the relation $r_{ji}=r_{ij}^*$, without gaging these correlations become according to (25):

$$r_{ij}=\underline{a}_i^T R_{sF}\underline{a}_j^* \text{ and } r_{ji}=\underline{a}_j^T R_{sF}^t\underline{a}_i^* \quad (29)$$

Since the matrix $R_{sF}$ correlating the source vector $\underline{s}(t)$ with $\underline{s}_F(t)$ is not hermitian the relation $R_{sF}=R_{sF}^t$ is not satisfied and the covariance matrix $R_x$ cannot be written in the form $A\ R_{sF}\ A^t$ as is presupposed by the high-resolution goniometry methods. In this case $r_{ji}$ must not be deduced from $r_{ij}$ but should be estimated on a new switching so as to obtain $r_{ji}=\underline{a}_j^T R_{sF}\underline{a}_i^*$. To summarize without gaging N(N–1) switchings need to be carried out and with gaging the number of switchings can be reduced to N(N–1)/2. Without gaging it is necessary to observe the signal for twice as long.

The second acquisition system according to the invention and which is represented in FIG. 11 differs from the first through the fact that it implements only a part of the covariance matrix, thereby making it possible to carry out elementary goniometries over a shorter period.

The goniometry processing consists in successively performing cross-correlations between several pairs of sensors indexed by i and j and by using a method of processing based on the maximum likelihood algorithm. In the presence of N sensors around N different cross-correlations are estimated over a duration of observation T and on the basis of an instant $t_{ij}$ dependent on the sensor pair (i, j) chosen. The coefficient $\hat{r}_{ij}$ then satisfies the relations:

$$\hat{r}_{ij} = \frac{1}{T}\sum_{t=t_{ij}}^{t_{ij}+T} x_i(t)x_j(t)^* \quad (30)$$

Figure 16:
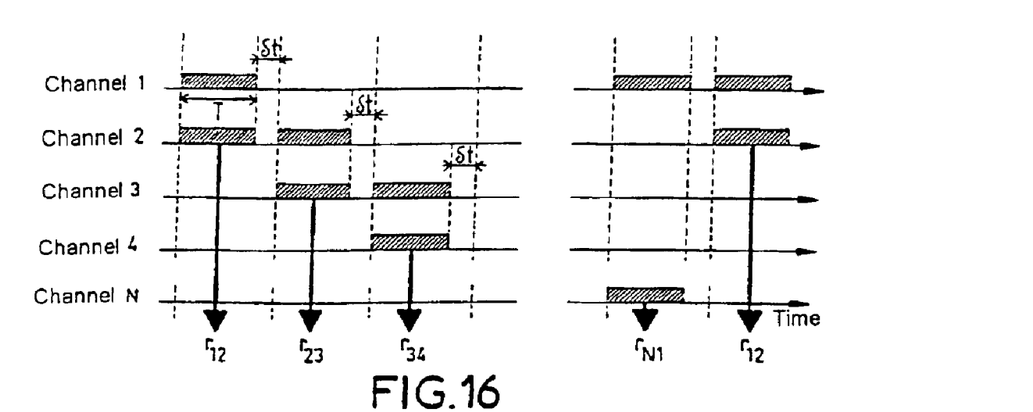
FIG. 16 a time chart illustrating the calculation of a reduced correlation matrix within the framework of a multisensor goniometry employing sensors pairwise.

When the integration time T tends to infinity $\hat{r}_{ij}$ tends to $r_{ij}=E[x_i(t)x_j(t)^*]$, the expression for which is:

$$r_{ij}=\underline{a}_i^T R_s \underline{a}_j^* \quad (31)$$

where $R_s=E[\underline{s}(t)\ \underline{s}(t)^t]$ denotes the covariance matrix of the incident sources. The calculation of these cross-correlations takes place according to the time chart of FIG. 16.

This calculation makes it possible to construct a vector $\underline{r}$ of length L containing the cross-correlations $r_{ij}$. To do this, the process consists in constructing vectors I and J containing the indices of the correlating sensors. Thus the first component of $\underline{r}$ correlates the sensors I(1) and J(1) and calculates the term $r_{I(1)J(1)}$. The vector $\underline{r}$ then has the following expression:

$$\underline{r} = \begin{bmatrix} r_{I(1)J(1)} \\ \vdots \\ r_{I(L)J(L)} \end{bmatrix} \quad (32)$$

Letting $\gamma_{mm'}$ denote the term of $R_s$ in the $m^{th}$ row and $m'^{th}$ column, the scalar $r_{ij}$ then the vector $\underline{r}$ become in accordance with (31) and (32):

$$r_{ij} = \sum_{m=1}^{M}\sum_{m'=1}^{M} \gamma_{mm'} a_i(\theta_m)a_j(\theta_{m'})^* \quad (33)$$

$$\underline{r} = \sum_{m=1}^{M}\sum_{m'=1}^{M} \gamma_{mm'}\ \underline{a}_I(\theta_m)\cdot\underline{a}_J(\theta_{m'})^* \quad (34)$$

with $$\underline{a}_I(\theta)=[a_{I(1)}(\theta)\ \ldots\ a_{I(L)}(\theta)]^T \text{ and } \underline{a}_J(\theta)=[a_{J(1)}(\theta)\ \ldots\ a_{J(L)}(\theta)]^T$$

$\underline{a}_I(\theta)$ corresponds to the direction vector associated with the sensors indexed by I and $\underline{a}_J(\theta)$ to those indexed by the elements J. The symbol "·" denotes the term-by-term product of the vectors. The vector $\underline{r}$ is formed by a linear combination of at most $M^2$ vectors, and can be written in the same manner as equation (11), i.e:

$$\underline{r} = \begin{bmatrix} r_{I(1)J(1)} \\ r_{I(L)J(L)} \end{bmatrix} = A_{IJ}(\theta_1, \ldots, \theta_M)\gamma \quad (35)$$

with $$A_{IJ}(\theta_1 \ldots, \theta_M) = [\underline{a}_I(\theta_1) \cdot \underline{a}_J(\theta_1)^* \ldots \underline{a}_I(\theta_m) \cdot \underline{a}_J(\theta_{m'})^* \ldots \underline{a}_I(\theta_M) \cdot \underline{a}_J(\theta_M)^*]$$

and $$\gamma = [\gamma_{11'} \ldots \gamma_{1M'}\gamma_{21'} \ldots \gamma_{2M'} \gamma_{M1'} \ldots \gamma_{MM'}]^T$$

The modelling of the vector $\underline{r}$ according to expression (35) makes it possible to apply an algorithm of the maximum likelihood type of Gauss-Newton type described in Annex C. Thus after having normalized the vector $\underline{r}$ into $\underline{\tilde{r}}$, it is sufficient to search for the $M^{tuple}(\theta_1 \ldots \theta_m)$ which minimizes the following criterion:

$$J(\theta_1 \ldots \theta_M) = \text{trace}[(I - A_{IJ}(\theta_1 \ldots \theta_M)(A_{IJ}(\theta_1 \ldots \theta_M)^t A_{IJ}(\theta_1 \ldots \theta_M))^{-1} A_{IJ}(\theta_1 \ldots \theta_M)^t)\underline{\tilde{r}} \underline{\tilde{r}}^t] \quad (36)$$

Figure 17:
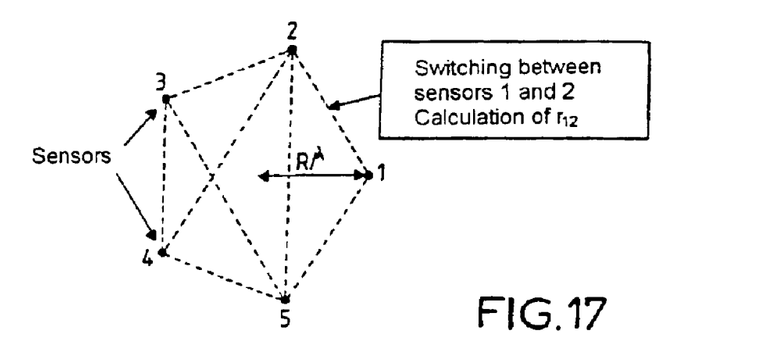
FIG. 17 the switching diagram for a pentagonal network of sensors using the pairwise sensor goniometry process.
Figure 18:
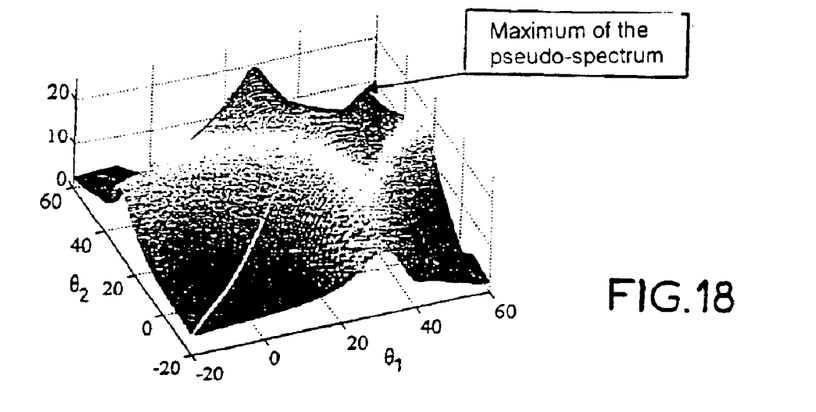
FIGS. 18 and 19 a pseudo-spectrum obtained in a goniometry with two sources.

Given that the matrix $A_{IJ}$ is of the dimension $L \times M^2$, this method is applicable in theory only when $M^2$ is strictly less than the number of switchings L and in practice than L/2. Thus by using a network of N=5 sensors as is often the case in V/UHF, it is possible in theory to direction find at most two sources and in practice one source. However, by increasing the number of switchings to 8, it becomes possible to perform the goniometry of two sources. The following simulation shows the result of a test of this method on a pentagonal network of radius $R/\lambda$ normalized by the wavelength equal to 0.55 where the number of sensors equals N=5. The vector $\underline{r}$ is constructed over L=8 switchings such that $\underline{r} = [r_{12}\ r_{23}\ r_{34}\ r_{45}\ r_{51}\ r_{24}\ r_{25}\ r_{35}]^T$. In FIG. 17 the sensor network associated with the switchings I=[1 2 3 4 5 2 2 3] and J=[2 3 4 5 1 4 5 5] chosen in this example is represented.

Figure 19:
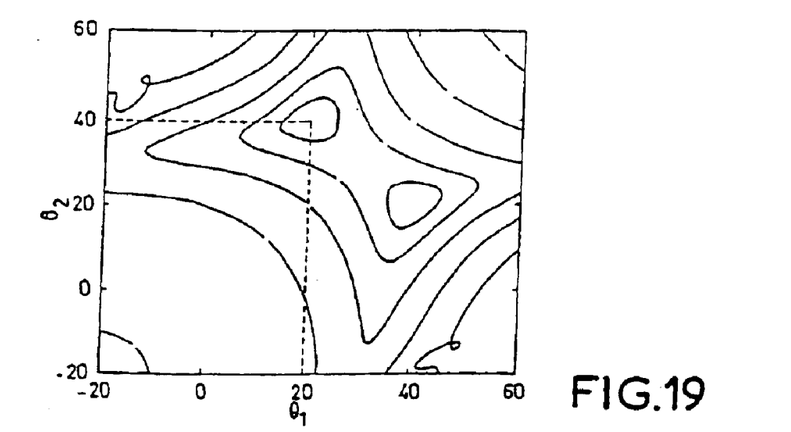

This simulation is that of two BPSK sources comprising 10 samples per symbol, with angle of incidence $\theta_1=20$ deg and $\theta_2=40$ deg and with signal-to-noise ratio equal to 10 dB. The cross-correlations $r_{ij}$ are estimated over T=1000 samples. The maximum likelihood consists in finding the minimum of the two-dimensional function $J(\theta_1, \theta_2)$ or the maximum of $-10 \log_{10}(J(\theta_1, \theta_2))$ as represented in FIG. 19. This figure shows that the spectrum contains maxima at around (20°, 40°) and symmetrically (40°, 20°) which correspond to the angles of incidence of the two sources. The maxima of this spectrum can be seen better in the iso-level curve of FIG. 19.

In the presence of uncorrelated signals, equation (34) becomes:

$$\underline{r} = \sum_{m=1}^{M} \gamma_{mm} \underline{a}_{IJ}(\theta_m) \quad (37)$$

where $a_{IJ}(\theta) = \underline{a}_I(\theta) \cdot \underline{a}_J(\theta)^*$ is a composite direction vector. The latter equation is entirely equivalent to equation (12) except that the direction vector $\underline{a}(\theta)$ has been replaced by the vector $\underline{a}_{IJ}(\theta)$. Since the goniometry performances as regards ambiguity and resolution depend on the direction vector it is interesting to assess the equivalent network corresponding to the direction vector $\underline{a}_{IJ}(\theta)$.

The $n^{th}$ component $a_n(\theta)$ of the vector $\underline{a}(\theta)$ is the response of sensor n to a source with angle of incidence $\theta$. Letting $(x_n, y_n)$ denote the coordinates of sensor n in the network the scalar $a_n(\theta)$ has the following expression:

$$a_n(\theta) = \exp(j2\pi/\lambda(x_n \cos(\theta) + y_n \sin(\theta))) \quad (38)$$

and the $I^{th}$ component of the vector $\underline{a}_{IJ}(\theta)$ has the expression:

$$a_{IJ}(\theta) = a_{I(I)}(\theta)a_{J(I)}(\theta)^* = \exp(j2\pi/\lambda([x_{I(I)} - x_{J(I)}]\cos(\theta) + [y_{I(I)} - y_{J(I)}]\sin(\theta))) \quad (39)$$

This expression shows that this $I^{th}$ component can be the response of a virtual sensor with coordinates $(x_{I(I)} - x_{J(I)}, y_{I(I)} - y_{J(I)})$. By performing L switchings this is equivalent to using L virtual sensors. By using a traditional pentagonal network the switching onto the small bases consists in taking I=[1 2 3 4 5] and J=[2 3 4 5 1] and large bases I=[1 2 3 4 5] and J=[3 4 5 1 2].

Figure 20:
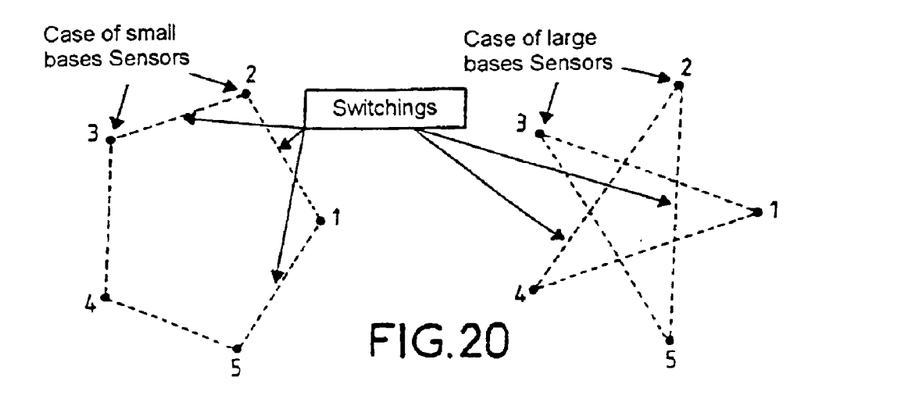
FIGS. 20 and 21 configurations of equivalent networks.

FIG. 20 illustrates these two categories of switchings. Thus the equivalent networks with small bases and large bases have the form represented in FIG. 21 with respect to the initial pentagonal network.

Figure 21:
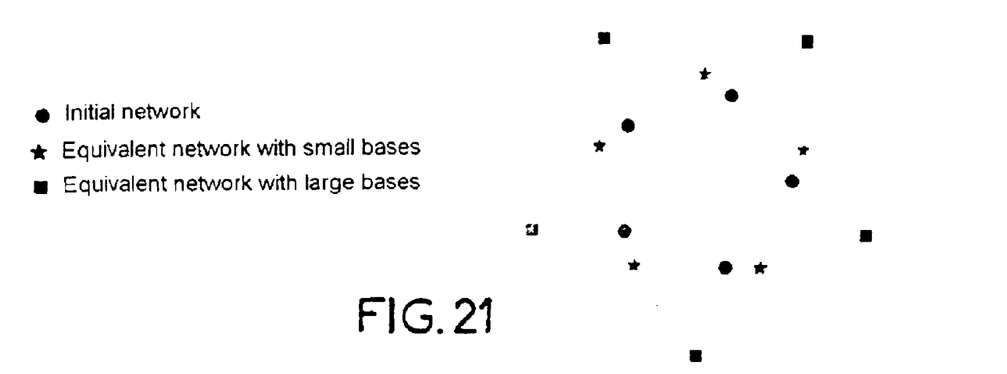

This FIG. 21 shows that the equivalent network with large bases is larger than that with small bases. Thus by switching onto the large bases the processing is more accurate. However, the normalized radius of this network should not be allowed to exceed 0.8 so as not to be ambiguous, which implies that not just any set of switchings can be chosen to carry out a two-channel goniometry and that it is necessary to know which equivalent network these switchings correspond to.

To perform a minimum of switchings, ideally L=N sensors should be switched. However, in the case of a V/UHF network with 5 sensors the above method has shown that it is difficult to perform goniometry on more than one source. In order to increase this number of sources the following scheme consists in increasing the size of $\underline{r}$. Since the number of switchings is limited, the size of $\underline{r}$ is modified without changing the number of switches by utilizing the hermitian structure of the covariance matrix $R_s$ of the sources. In this case the cross-correlation $\gamma_{mm'}$ between the sources m and m' satisfies:

$$\gamma_{mm'} = \gamma_{m'm}^* \quad (40)$$

In accordance with (34) and (40), we deduced from this that the conjugate of $\underline{r}$ has the following expression:

$$\underline{r}^* = \sum_{m=1}^{M} \sum_{m'=1}^{M} \gamma_{mm'} \underline{a}_J(\theta_m) \cdot \underline{a}_I(\theta_{m'})^* \quad (41)$$

The difference as compared with the expression for $\underline{r}$ is that the composite direction vector $\underline{a}_I(\theta_m) \cdot \underline{a}_J(\theta_{m'})^*$ is replaced by $\underline{a}_J(\theta_m) \cdot \underline{a}_I(\theta_{m'})^*$. In accordance with equation (35), the matrix expression for $\underline{r}^*$ becomes:

$$\underline{r}^* = A_{JI}(\theta_1, \ldots \theta_M) \quad (42)$$

Thus, to increase the size of $\underline{r}$ without increasing the number of switchings the scheme consists in constructing a vector $\underline{v}$ such that:

$$\underline{v} = \begin{bmatrix} \underline{r} \\ \underline{r}^* \end{bmatrix} = \begin{bmatrix} A_{IJ}(\theta_1 \ldots \theta_M) \\ A_{JI}(\theta_1 \ldots \theta_M) \end{bmatrix} \gamma = B_{JI}(\theta_1, \ldots, \theta_M)\gamma \quad (43)$$

The modeling of the vector $\underline{v}$ according to expression (43) makes it possible to apply an algorithm of the maximum likelihood type in order to retrieve the angles of incidence of the sources. Thus after having normalized the vector $\underline{v}$ into $\underline{\tilde{r}}$, the method comprises a step of searching for the $M^{tuple}$ ($\theta_1 \ldots \theta_M$) which minimizes the criterion:

$$J(\theta_1 \ldots \theta_M) = \text{trace}[(I - B_{IJ}(\theta_1 \ldots \theta_M)(B_{IJ}(\theta_1 \ldots \theta_M))^t B_{IJ}(\theta_1 \ldots \theta_M))^{-1} B_{IJ}(\theta_1 \ldots \theta_M))^{554}) \underline{\tilde{r}} \, \underline{\tilde{r}}^t] \quad (44)$$

Figure 22:
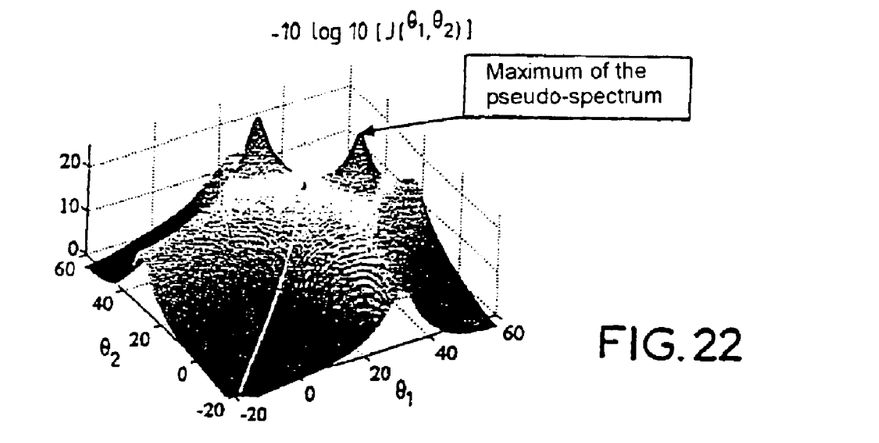
FIGS. 22 and 23 pseudo-spectra obtained for two sources by using an indirect maximum likelihood algorithm.
Figure 23:
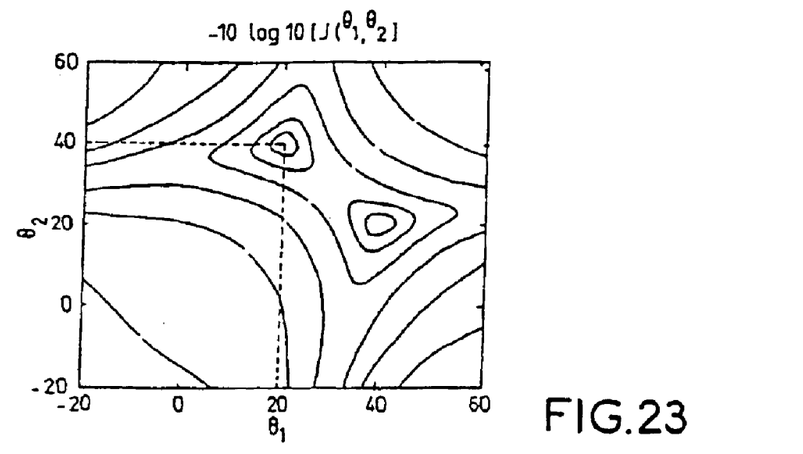
Figure 24:
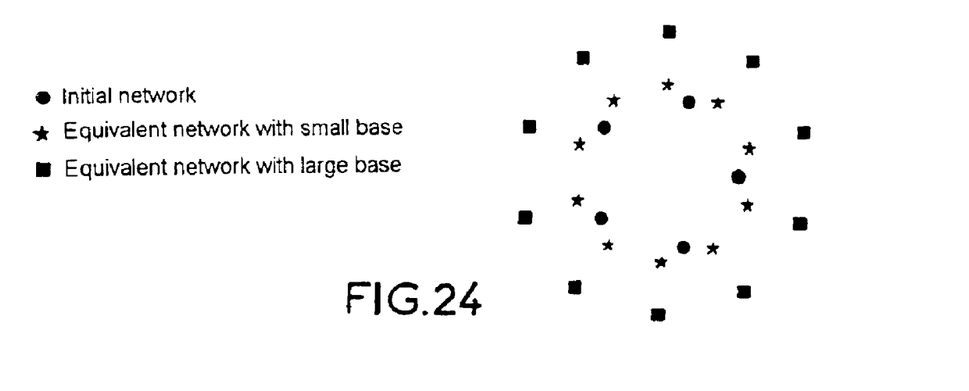
FIG. 24 a transformation of a pentagonal network of sensors with large base and small base into a network of ten sensors.

Given that the matrix $B_{IJ}$ is of dimension $2L \times M^2$, the method is applicable in theory when $M^2$ is considerably less than the number of switchings $2L$ and in practice than $L$. Thus in V/UHF, by using a network $N=5$ sensors, it is possible in theory to direction find at most 4 sources and in practice two sources with 5 switchings. The result of a test of this method on the large bases of the pentagonal network of radius $R/\lambda=0.55$ is represented in FIGS. 22 and 23. These results have been obtained with the vector $\underline{r}$ over $L=5$ switchings such that $\underline{r} = [r_{13} \, r_{24} \, r_{35} \, r_{45} \, r_{52}]^T$ and the associated vector $\underline{v}$ is then deduced therefrom. As in the previous example, 2 BPSK sources with a symbol time of 10 samples, angle of incidence $\theta_1 = 20$ deg and $\theta_2 = 40$ deg and signal-to-noise-ratio of 10 dB are simulated. The cross-correlations $r_{ij}$ are estimated over $T = 1000$ samples. The maximum likelihood is obtained by searching for the minimum of the two-dimensional function $J(\theta_1, \theta_2)$.

The curves of FIGS. 22 and 23 reveal a maximum at around (20°, 40°) and symmetrically at (40°, 20°), this corresponding to the angles of incidence of the two sources.

In the presence of uncorrelated signals, equation (43) becomes:

$$\underline{v} = \sum_{m=1}^{M} \gamma_{mm'} \underline{b}_{IJ}(\theta_m) \quad (45)$$

where $\underline{b}_{IJ}(\theta) = [\underline{a}_{IJ}(\theta)^T \, \underline{b}_{IJ}(\theta)^T]^T$ is a composite direction vector. This last equation is entirely equivalent to equation (37) except that the direction vector $\underline{a}_{IJ}(\theta)$ has been replaced by $\underline{b}_{IJ}(\theta)$. With the same reasoning as before it is possible to associate the direction vector $\underline{b}_{IJ}(\theta)$ has an equivalent network composed of $2L$ sensors. In this case it can be shown that the $I^{th}$ component of $\underline{b}_{IJ}(\theta)$ is associated with a virtual sensor with coordinates $(x_{I(l)} - x_{J(l)}, y_{I(l)} - y_{J(l)})$ and its $(I+L)^{th}$ component is associated with the sensor with coordinates $(x_{I(l)} + x_{J(l)}, y_{I(l)} + y_{J(l)})$. Thus the networks with small bases and large bases which are the equivalent of an initial pentagonal network are circular networks each comprising 10 sensors.

In the description of the various embodiments of the invention it has been presupposed that the amplitude of the signal over each of the switchings is stationary. Under these conditions, regardless of the switching (i,j) the covariance matrix of the sources $R_s$ of (11) (15) remains constant and:

$$r_{ij} = \underline{a}_i^T R_s \underline{a}_j^* \quad (47)$$

If the amplitude of the signal varies the matrix $R_s$ then depends on the instant $t_{ij}$ of the start of acquisition of the switching (i,j) and contrary to expression (11) the vector $\underline{r}$ then takes the form:

$$\underline{r} = \begin{bmatrix} r_{10} \\ \vdots \\ r_{N0} \end{bmatrix} = \begin{bmatrix} a_1 R_s(t_{10}) a_0^* \\ \vdots \\ a_N R_s(t_{N0}) a^* \end{bmatrix} \neq A \, R_s \underline{a}_0^* = A \, \underline{k} \text{ if} \quad (48)$$

$$r_{ij} = \underline{a}_i^T R_s(t_{ij}) \underline{a}_j^*$$

Since $R_s$ is a function of $t_{ij}$ $R_s$ can no longer be factored in the expression (48). However, in order for the same reasoning followed by the establishing of the expression (15) to be able to apply, the covariance matrix of the sources $R_s$ must remain constant, that is to say the energy of the signals must remain constant over a duration of $L \times T$ (L: number of switchings and T: integration time over a switching). This makes it necessary before carrying out a two-channel goniometry to have an accurate idea of the duration of the stationarity of the signal in terms of amplitude. Over this duration all the switchings required in order to apply a two-channel goniometry method have to be carried out. However, this duration of stationarity of the signal is not necessarily compatible with the integration time T over each switching required to carry out a two-channel goniometry. Thus in order to integrate over T with a duration of stationarity of $D_s$ and a number of switchings equal to $L$ the following integration has to be carried out:

$$r_{ij} = \frac{1}{K} \sum_{k=1}^{K} r_{ij}(k) \text{ with } r_{ij}(k) = \frac{1}{T_L} \sum_{t=t_{ij}}^{t_{ij}+T_L} x_i(t + kD_s) x_j(t + kD_s)^* \quad (49)$$

with: $D_s$: Duration of stationarity of the signal
L: Number of switchings
$t_{ij}$ ($0 < t_{ij} < D_s$): Initial instant of integration of switching (i,j)
$T_L = D_s/L$: Elementary integration time
$T = K \, T_L$: Total integration time over switching (i,j)

If this signal is stationary in amplitude between the instants $kD_s$ and $(k+1)D_s$ all the switchings (i,j) will satisfy the following relation:

$$\forall (i,j) \, r_{ij}(k) = \underline{a}_i^T R_s(k) \underline{a}_j^* \quad (50)$$

And consequently expression (49) will become:

$$\forall (i, j) \, r_{ij} = \underline{a}_i^T R_s \underline{a}_j^* \text{ with } R_s = \frac{1}{K} \sum_{k=1}^{K} R_s(k) \quad (51)$$

Figure 25:
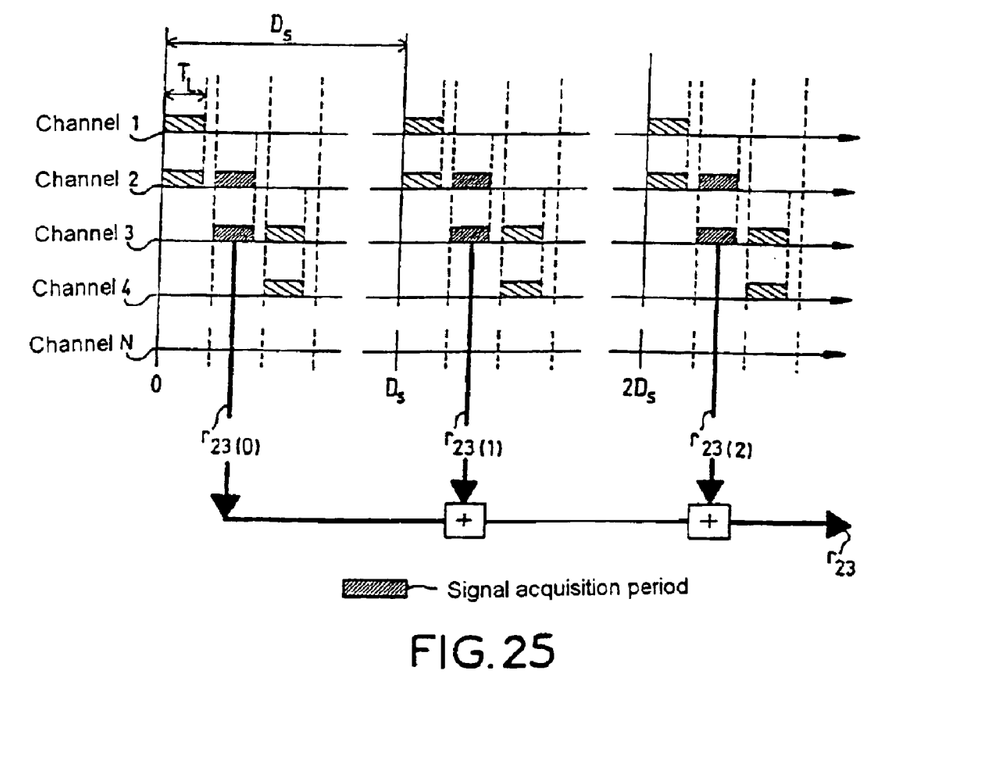
FIG. 25 a time chart for illustrating the cross-correlation calculations on nonstationary signals.

The covariance matrix obtained for the signal $R_s$ is independent of the switching (i,j) after having estimated $r_{ij}$ over an integration time T greater than the duration of stationarity of the signal. Under these conditions the two-channel goniometry methods described previously are applicable. The diagram of FIG. 25 summarizes the integration of expression (49) taking account of the nonstationarity of the signal.

Annex A

Gauss-Newton for the Maximum Likelihood in Azimuth

The objective is to search for the minimum of the multi-dimensional criterion $J(\underline{\theta})$ where $\underline{\theta} = [\theta_1 \ldots \theta_M]^T$ such that:

$$J(\underline{\theta}) = \text{trace}[I - A(\underline{\theta})[A(\underline{\theta})^t A(\underline{\theta})]^{-1} A(\underline{\theta})^t) UU^{554}]$$

Where $A(\theta_1 \ldots \theta_M)$ denotes the matrix of direction vectors. The objective is to find a minimum of M components $\underline{\theta}_{min}$ of the function based on initializing the azimuths to $\underline{\theta}^0$. The Gauss_Newton is based on the second-order finite expansion of the function $J(\underline{\theta})$ in the neighborhood of $\underline{\theta}^k$ such that:

$$J(\underline{\theta}) \approx J(\underline{\theta}^k) + (\underline{\theta}^k - \underline{\theta})^T \nabla_k + (\underline{\theta}^k - \underline{\theta})^T H_k (\underline{\theta}^k - \underline{\theta}) \quad (a.1)$$

Where $\nabla_k$ denotes the gradient and $H_k$ the Hessian such that:

$$\nabla_k(i) = \frac{\partial J(\underline{\theta}^k)}{\partial \theta_i} \text{ and } H_k(i,j) = \frac{\partial^2 J(\underline{\theta}^k)}{\partial \theta_i \partial \theta_j}$$

The function minimum of the expression (a.1) is found at $\underline{\theta} = \underline{\theta}^{k-1}$ such that:

$$\underline{\theta}^{k+1} = \underline{\theta}^k - H_k^{-1} \nabla_k \quad (a.2)$$

Since in the neighborhood of $\underline{\theta}^k$ the function $J(\underline{\theta})$ is more or less like the quadratic form of expression (a.1), the operation of equation (a.2) must be carried out until the discrepancy between $\underline{\theta}^k$ and $\underline{\theta}^{k+1}$ becomes very small: Under these conditions the Gauss-Newton has converged and $\underline{\theta}_{min} = \underline{\theta}^{k+1}$.

To carry out the Gauss-Newton it is necessary to calculate the gradient and the Hessian at $\underline{\theta}^k$. To do this, we firstly carry out a QR decomposition of $A(\underline{\theta}^k)$ such that:

$$A(\underline{\theta}^k) = QR = [Q_1 \ Q_2] \begin{bmatrix} R_1 \\ 0 \end{bmatrix} \Rightarrow [A(\underline{\theta}^k)^t A(\underline{\theta}^k)]^{-1} A(\underline{\theta}^k)^t = R_1^{-1} Q_1^t \quad (a.3)$$

$$(I - A(\underline{\theta}^k)[A(\underline{\theta}^k)^t A(\underline{\theta}^k)]^{-1} A(\underline{\theta}^k)^t)$$

$$= Q_2 Q_2^t$$

The intermediate variables are as follows:

$$\Phi = Q_2^t D \quad \Psi = U^t Q_2 \quad \Gamma = R_1^{-1} Q_1^t U \quad (a.4)$$

$$\text{with } D = \begin{bmatrix} \frac{\partial \underline{a}(\theta_1)}{\partial \underline{\theta}_1} & \cdots & \frac{\partial \underline{a}(\theta_M)}{\partial \theta_M} \end{bmatrix}$$

The criterion, the gradient and the Hessian are then equal to:

$$J(\underline{\theta}^k) = \text{trace}[\Psi\Psi^t]$$

$$\nabla_k = -2\text{real}[\text{diag}\{\Gamma\Psi\Phi\}]$$

$$H_k = -2\text{real}[\text{diag}\{(\Phi + \Phi) \cdot (\Gamma\Gamma^t)^T\}]$$

Where trace (M) denotes the trace of the matrix M, diag {M} is a vector composed of the diagonal of the matrix M and real {M} its real part. Finally A·B denotes the term-by-term product of the matrices A and B.

The expressions for the gradient and for the Hessian of this Gauss-Newton are applicable when each column of the matrix $A(\underline{\theta})$ of the direction vectors depends on just one of the parameters of the vector $\underline{\theta}$. Under these conditions it is possible to concatenate all the derivatives of $A(\underline{\theta})$ with respect to $\underline{\theta}$ into a matrix D of the same dimension as $A(\underline{\theta})$. In particular the expressions hereinabove are not valid when the position of a source depends on two parameters (see Annex B).

Annex B

Gauss-Newton for the Maximum Likelihood in Azimuth and Elevation

In azimuth-elevation the direction vector $\underline{a}(\theta, \Delta)$ depends on the parameters $\theta$ and $\Delta$ which are respectively the azimuth and the elevation. Through a change of variable this vector can be parameterized by u and v such that:

$$\underline{a}(\theta, \Delta) = \underline{a}(u, v) \text{ with } u = \cos(\theta)\cos(\Delta) \text{ and } v = \sin(\theta)\cos(\Delta)$$

The objective is to seek, in the presence of M sources, the minimum of the multi-dimensional criterion $J(\underline{p})$ with $\underline{p} = [\underline{u}^T \underline{v}^T]$ $\underline{u} = [u_1 \ldots u_M]^T$ and $\underline{v} = [v_1 \ldots v_M]^T$ such that:

$$J(\underline{p}) = \text{trace}[(I - A(\underline{p})[A(\underline{p})^t A(\underline{p})]^{-1} A(\underline{p})^t) UU^t]$$

Each source is characterized by the pair $(u_m, v_m)$. As in Annex A, we carry out a second-order finite expansion of the function $J(\underline{p})$ in the neighborhood of $\underline{p}^k$ such that:

$$J(\underline{p}) \approx J(\underline{p}^k) + (\underline{p}^k - \underline{p})^T \nabla_k + (\underline{p}^k - \underline{p})^T H_k (\underline{p}^k - \underline{p}) \quad (b.1)$$

Where $\nabla_k$ denotes the gradient at $H_k$ the Hessian of J at $\underline{p}^k$. The minimum of the function of expression (b.1) lies at $\underline{p} = \underline{p}^{k+1}$ such that:

$$\underline{p}^{k+1} = \underline{p}^k - H_k^{-1} \nabla_k \quad (b.2)$$

As in Annex A, we regard the minimum of $J(\underline{p})$ as having been attained when the discrepancy between $\underline{p}^k$ and $\underline{p}^{k+1}$ becomes very small: Under these conditions the Gauss-Newton has converged to $\underline{p}_{min} = \underline{p}^{k+1}$.

To carry out the Gauss-Newton it is necessary to calculate the gradient and the Hessian at $\underline{p}^k$. To do this, we firstly carry out a QR decomposition of $A(\underline{p}^k)$ such that:

$$A(\underline{p}^k) = QR = [Q_1 \ Q_2] \begin{bmatrix} R_1 \\ 0 \end{bmatrix} \Rightarrow [A(\underline{p}^k)^t A(\underline{p}^k)]^{-1} A(\underline{p}^k)^t = R_1^{-t} Q_1^t \quad (b.3)$$

$$(I - A(\underline{p}^k)[A(\underline{p}^k)^t A(\underline{p}^k)]^{-1} A(\underline{p}^k)^t)$$

$$= Q_2 Q_2^t$$

The intermediate variables are as follows:

$$\Phi_u = Q_2^t D_u \quad \Phi_v = Q_2^t D_v \quad \Psi = U^t Q_2 \quad \Gamma = R_1^{-1} Q_1^t U \quad (b.4)$$

$$\text{with } D_u = \begin{bmatrix} \frac{\partial \underline{a}(u_1, v_1)}{\partial u_1} & \cdots & \frac{\partial \underline{a}(u_M, v_M)}{\partial u_M} \end{bmatrix}$$

$$\text{and } D_v = \begin{bmatrix} \frac{\partial \underline{a}(u_1, v_1)}{\partial v_1} & \cdots & \frac{\partial \underline{a}(u_M, v_M)}{\partial v_M} \end{bmatrix}$$

The criterion, the gradient and the Hessian are then equal to:

$$J(\underline{p}^k) = \text{trace}[\Psi\Psi^t]$$

$$\nabla_k = \begin{bmatrix} \nabla_{ku} \\ \nabla_{kv} \end{bmatrix} \text{ with } \begin{cases} \nabla_{ku} = -2 \text{ real}[\text{diag}\{\Gamma\Psi\Phi_u\}] \\ \nabla_{kv} = -2 \text{ real}[\text{diag}\{\Gamma\Psi\Phi_v\}] \end{cases}$$

$$H_k = \begin{bmatrix} H_{uu} & H_{uv} \\ H_{uv} & H_{vv} \end{bmatrix} \text{ with } \begin{cases} H_{uu} = 2\text{real}[\text{diag}\{(\Phi_u^t \Phi_v) \cdot (\Gamma\Gamma^T)^T\}] \\ H_{uv} = 2\text{real}[\text{diag}\{(\Phi_u^t \Phi_v) \cdot (\Gamma\Gamma^t)^T\}] \\ H_{vv} = 2\text{real}[\text{diag}\{(\Phi_u^t \Phi_v) \cdot (\Gamma\Gamma^t)^T\}] \end{cases}$$

Annex C

Gauss-Newton for the MV with Two Channels per Pair of Antennas in Azimuth

The objective is to search for the minimum of the multi-dimensional criterion $J(\underline{\theta})$ where $\underline{\theta} = [\theta_1 \ldots \theta_M]^T$ without prior assumption regarding the structure of the matrix of the direction vectors $A(\underline{\theta})$. In particular in the case of MV with two channels per pair of antennas the matrix $A(\underline{\theta})$ does not have the structure required by Annex A. This remark is valid for the channel-pair-based direct and indirect methods:

$$J(\underline{\theta})=\text{trace } [(I-A(\underline{\theta})[A(\underline{\theta})^t A(\underline{\theta})]^{-1} A(\underline{74})^t) UU^t]$$

As in Annexes A and B we carry out a second-order finite expansion of the function $J(\underline{\theta})$ in the neighborhood of $\underline{\theta}^k$ such that:

$$J(\underline{\theta}) \approx J(\underline{\theta}^k) + (\underline{\theta}^k - \underline{\theta})^T \nabla_k + (\underline{\theta}^k - \underline{\theta})^T H_k (\underline{\theta}^k - \underline{\theta}) \quad \text{(c.1)}$$

Where $\nabla_k$ denotes the gradient and $H_k$ the Hessian. The function minimum of expression (c.1) lies at $\underline{\theta} = \underline{\theta}^{k+1}$ such that:

$$\underline{\theta}^{k+1} = \underline{\theta}^k - H_k^{-1} \nabla_k \quad \text{(c.2)}$$

Since in the neighborhood of $\underline{\theta}^k$ the function $J(\underline{\theta})$ is more or less like the quadratic form of expression (c.1), the operation of equation (c.2) must be carried out until the discrepancy between $\underline{\theta}^k$ and $\underline{\theta}^{k+1}$ becomes very small: Under these conditions the Gauss-Newton has converged and $\underline{\theta}_{min} = \underline{\theta}^{k+1}$. The gradient and the Hessian are calculated directly and the following result is obtained:

$$\nabla_k(i) = \frac{\partial J(\underline{\theta}^k)}{\partial \theta_i} = -2\text{real}\left[\text{trace}\left\{\prod_b (\underline{\theta}^k) D_i(\underline{\theta}^k) A(\underline{\theta}^k)^\# UU^t\right\}\right]$$

$$H_k(i,j) = \frac{\partial^2 J(\underline{\theta}^k)}{\partial \theta_i \partial \theta_j}$$
$$= -2\text{real}\left[\text{trace}\left\{\prod_b (\underline{\theta}^k) D_i(\underline{\theta}^k)[A(\underline{\theta})^t A(\underline{\theta})]^{-1} D_j(\underline{\theta}^k)^t \prod_b (\underline{\theta}^k) UU^t\right\}\right] +$$
$$2\text{real}\left[\text{trace}\left\{A(\underline{\theta}^k)^{\#t} D_j(\underline{\theta}^k) \prod_b (\underline{\theta}^k) D_i(\underline{\theta}^k)^t A(\underline{\theta}^k)^\# UU^t\right\}\right] +$$
$$2\text{real}\left[\text{trace}\left\{\prod_b (\underline{\theta}^k) D_i(\underline{\theta}^k) A(\underline{\theta}^k)^\# D_j(\underline{\theta}^k)^t A(\underline{\theta}^k)^\# UU^t\right\}\right] +$$
$$2\text{real}\left[\text{trace}\left\{\prod_b (\underline{\theta}^k) D_j(\underline{\theta}^k) A(\underline{\theta}^k)^\# D_i(\underline{\theta}^k)^t A(\underline{\theta}^k)^\# UU^t\right\}\right]$$

$$A(\underline{\theta})^\# = [A(\underline{\theta})^t A(\underline{\theta})]^{-1} A(\underline{\theta})^t$$
$$\prod_b (\underline{\theta}) = I - A(\underline{\theta}) A(\underline{\theta})^\#$$
$$D_i(\underline{\theta}) = \frac{\partial A(\underline{\theta})}{\partial \theta_i}$$

What is claimed is:

1. A process for locating radio sources by a two-channel high resolution radio goniometer including a network of a predetermined number of sensors, the process comprising:
multiplexing signals supplied by the sensors on inputs of first and second receivers;
estimating a covariance matrix of signals supplied by the first and second receivers by calculating successive cross-correlations respectively between signals multiplexed through the first receiver and a signal supplied by a reference sensor and obtained at an output of the second receiver; and
estimating angles of arrival of waves emitted by the radio sources based on the estimated covariance matrix.

2. The process as claimed in claim 1, wherein the estimating comprises determining a cross-correlation vector based on a cross-correlation elements and applying a MUSIC type algorithm.

3. The process as claimed in claim 1, wherein the estimating comprises concatenating all the cross-correlations to form one and a same vector and applying a method of maximum likelihood type.

4. The process as claimed in claim 1, wherein the estimating is obtained through calculation of cross-correlation between pairs of sensors.

5. The process as claimed in claim 1, further comprising supplementing one of the first and second receivers with a gage filter.

6. A two-channel high resolution radiogoniometer for locating radio sources comprising:
a predetermined number of sensors;
first and second receivers coupled, respectively, to the sensors, through a multiplexer, and to a reference sensor and a calculation device;
wherein the calculation device is coupled to outputs of the first and second receivers, and performs the steps:
calculating successive cross-correlations, respectively, between signals multiplexed through the first receiver and a signal supplied by the reference sensor and obtained at an output of the second receiver, and
estimating angles of arrival of waves emitted by the radio sources based on an estimated covariance matrix.

* * * * *